United States Patent [19]
Khaund et al.

[11] Patent Number: 5,593,468
[45] Date of Patent: Jan. 14, 1997

[54] SOL-GEL ALUMINA ABRASIVES

[75] Inventors: Arup K. Khaund; Ajay K. Garg, both of Northborough, Mass.; Ralph Bauer, Niagara Falls, Canada

[73] Assignee: Saint-Gobain/Norton Industrial Ceramics Corporation, Worcester, Mass.

[21] Appl. No.: 506,940

[22] Filed: Jul. 26, 1995

[51] Int. Cl.$^6$ .................................................... C09C 1/66
[52] U.S. Cl. ............................................ 51/309; 501/127
[58] Field of Search ................................. 51/309; 501/12, 501/127

[56] References Cited

U.S. PATENT DOCUMENTS

| | | | |
|---|---|---|---|
| 4,623,364 | 11/1986 | Cottringer et al. | 51/309 |
| 5,190,567 | 3/1993 | Tamamaki et al. | 51/309 |
| 5,215,551 | 6/1993 | Hatahaka et al. | 51/309 |
| 5,453,104 | 9/1995 | Schwabel | 51/309 |

*Primary Examiner*—Deborah Jones
*Attorney, Agent, or Firm*—David Bennett

[57] ABSTRACT

The use of purified process materials in the production of a seeded sol-gel alumina abrasive results in an abrasive of superior properties.

14 Claims, No Drawings

SOL-GEL ALUMINA ABRASIVES

BACKGROUND OF THE INVENTION

This invention relates to aluminous abrasive grits and particularly to seeded sol-gel alumina abrasive materials with improved grinding performance. Such aluminas are made up of sub-micron alpha alumina crystals and the abrasive grits are sintered to essentially full theoretical density, that is in excess of 95% of the theoretical figure for alpha alumina.

Seeded sol-gel alumina abrasives are conventionally produced by uniformly dispersing sub-micron sized particles of alpha alumina particles in an aqueous dispersion, such as a sol or gel, of an alpha alumina precursor, (which is usually but not essentially, boehmite). The water is then removed and the mixture is fired to above the conversion temperature at which alpha alumina is formed and sintered to essentially theoretical density. A simple seeded sol-gel process is described for example in U.S. Pat. No. 4,623,364.

The firing operation performs the tasks of converting the transitional alumina forms present in the dried gel to the alpha form and the sintering of the alpha alumina closes up residual porosity and ensures that the particles have adequate density and hardness to function well as abrasive grits. It is known that excessive time at sintering temperatures, which are generally between 1300° and 1400° C. for seeded sol-gel materials and about 100° C. higher than that for unseeded sol-gel aluminas, can lead to crystal growth. Since crystal growth is generally regarded as undesirable because it is associated with loss of abrasive properties, it is often considered appropriate to incorporate into the gel certain oxides which act to limit the crystal size growth. U.S. Pat. No. 4,314,827 teaches magnesia and zirconia for this purpose in connection with unseeded sol-gel processes, and U.S. Pat. No. 4,623,364 adds silica, zirconia and chromia to the list for seeded sol-gel processes. In spite of the above teaching U.S. Pat. No. 4,314,827 for reasons that are unspecified in the patent, positively excludes significant amounts of calcia and alkali metal oxides from the scope of the invention claimed. In more recent times it has been disclosed that products made with the incorporation of minor amounts of rare earth metal oxides, yttria, transition metal oxides and lithium oxide bring advantageous results whether the gel is seeded or unseeded. See for example U.S. Pat. Nos. 4,770,671; 4,881951; 5,188,908; 5,190,567; 5,192,339; 5,215,551; 5,387,268; and 5,403,795 and European Applications 408,771; 594,455; 561,865; and 622,438.

It has now been found that the amount of such minor components should be controlled within narrow limits to obtain the best abrasive alumina grits by a seeded sol-gel process. This is somewhat surprising in view of the many patents teaching the positive advantages of the incorporation of minor amounts of oxides to modify the grain boundaries of the crystal structures or form a separate phase at such boundaries.

DESCRIPTION OF THE INVENTION

The present invention provides a seeded sol-gel alumina-based abrasive grain wherein the grain comprises minor amounts of impurities selected from compounds of alkali metals, alkaline earth metals, transition metals, rare earth metals and silica wherein the amount of calcium present is less than 100 ppm, the total amount of impurities is less than 4000 ppm, all impurities being measured as the oxides of the respective elements. Preferably the percentage by weight of calcium based on the total impurities is less than 5%.

In another aspect, the invention provides a process for the production of a seeded sol-gel alumina abrasive material which comprises forming a dispersion of an alpha alumina precursor in water, adding thereto submicron alpha alumina material in an amount of up to about 10% by weight to provide nucleation centers for the conversion of the precursor to the alpha phase, and thereafter removing the water and firing to a temperature sufficient to cause the formation of alpha alumina and to sinter the alumina to essentially theoretical density, wherein the materials used are selected such that the fired alumina consists of alpha alumina with metal oxide impurities in which the total amount by weight of calcia is less than 100 ppm and the total amount of metal oxide impurities present is less than about 4000 ppm, all impurities being measured as their oxides. Preferably the calcia represents less than 5% of the total weight of all impurities present.

In the context of the present invention, the term "impurities" is used to cover all metal oxide components other than alumina present in the final abrasive grain. These usually either form a separate phase, (such as magnesia which forms a spinel with some of the alumina), or congregate at the crystal (or grain) boundaries. The invention therefore regards as "impurities" even those materials added as sintering aids or crystal growth inhibitors.

The sources of the metal oxide impurities can be many. They can arrive with the alpha alumina precursor as impurities in the source of the alumina precursor or as traces of catalyst used in the production of the precursor. This is a substantial contributor to the impurities since the best quality boehmites currently available contain as much as 2000 ppm of titania as well as lesser amounts of silica, magnesia and iron oxide. If the water used is taken from a municipal supply, this can contain substantial amounts of metal compounds such as calcium and magnesium compounds, (the amount depending on the source), that may end up in the alumina after firing in the form of oxides. If an acid is used to peptize the precursor dispersion, it may have metallic impurities in the solution. The alpha alumina seed or nucleation material, especially if it is produced by milling an aqueous dispersion in a ball mill using impure alpha alumina media, (which comprise significant amounts of silica, soda and calcia for example), may well contain silica as well as other impurities.

The removal of such impurities can be achieved by selection of high purity materials or by subjecting the starting materials to an ion exchange process to reduce the total level of metal oxide impurities until they represent less than 4000 ppm and preferably less than 3000 ppm and most preferably less than 2000 ppm, of the total alumina weight. Within this total impurity amount it is found that the amount of calcia present is very important. The actual amount in the compositions of the invention is less than 100 ppm, preferably less than 60 ppm and most preferably less than 50 ppm. The proportion of calcia in the impurities is preferably less than 5%, more preferably less than 2% by weight, and most preferably less than about 1%.

For the purposes of this specification the term metal oxide is understood to refer to the most stable oxide in an oxygen-containing atmosphere of the relevant element at the temperature at which the alpha alumina is sintered. Silica is regarded as a metal oxide and metal silicates and spinels are regarded as mixtures of the component metal oxides for the purpose of calculating the amounts of the metal oxide impurities.

The alpha alumina precursor used in the process of the invention is preferably a boehmite and more preferably a boehmite with a BET surface area of at least 150 $m^2$/gm, and most preferably above 200 $m^2$/gm, such as from 200 to 400 $m^2$/gm. Remarkably it is found that when a boehmite with a BET surface area of from 200–400 $m^2$/gm is used and the materials are selected such that the product has a total impurity level below 3000 ppm, an alpha alumina with a crystal size of less than 150 nm, such as less than 120 nm, (that is with essentially no crystals larger than the specified maximum number as measured by the average intercept method), is obtained. Since smaller crystal size correlates closely with improved grinding performance, this is a significant finding.

The alpha alumina seed material is preferably obtained by milling fine alpha alumina particles since such material usually has a lower level of impurities than obtained by the use of the material obtained in a ball mill using impure alumina media and a charge of water. However in the event such a "milled water" source is used, the level of impurities can be brought within acceptable levels by ion-exchange of the "milled water" or sometimes even by repeated separation of the aqueous medium and replacement with deionized water until the soluble impurities have been essentially completely removed from the dispersion. The alpha alumina seed material preferably has a BET surface area in excess of 100 $m^2$/gm, such as from 100 to 200 $m^2$/gm.

DESCRIPTION OF PREFERRED EMBODIMENTS

The invention is now further described with reference to the following Examples which are understood to be for the purposes of illustration only and are intended to imply no necessary limitation of the scope of the invention.

EXAMPLE 1

Since a major source of impurities is the process water, two experiments were carried out side-by-side with the only difference being the use of deionized process water throughout in the process according to the invention and regular tap water for the comparative experiment.

In each case a commercial boehmite having a BET surface area of from 180–190 $m^2$/gm was suspended in water along with sub-micron micron alpha alumina nucleation material. The resulting sol was peptized using nitric acid and allowed to form a gel. This gel was extruded, dried and crushed to form a roughly graded particulate material. This was then calcined and fired in a rotary kiln until fully converted to alpha alumina and sintered to density of 3.87 g/cc. In the practice of this technology, this implies at least about 97% of the theoretical density. The fired material was graded and a 80 grit, (using the ANSI scale), fraction was separated for evaluation. Each had a hardness of at least 20 Gpa and the average alpha alumina crystal size was less than 0.2 micron as measured by the intercept method.

As indicated above, all operations in both preparations were carried out under identical conditions save for the use of deionized process water at all points in which water or acid was added. The chemical analyses of the two alpha alumina abrasive grits obtained showed the following compositions:

TABLE 1

| ABRASIVE | Total Impurities (T) ppm | Calcia (C) ppm | Ratio C/T % |
| --- | --- | --- | --- |
| INVENTION | 2570 | 50 | 2 |
| COMPARATIVE | 2770 | 180 | 6.5 |

These abrasive grits were then used to produce vitreous bonded grinding wheels using identical vitreous bonds in exactly the same proportions to produce wheels with exactly the same grade and structure. These wheels were used to grind 52100 steel in a wet OD cylindrical grinding mode. The G-Ratios (the ratio of metal weight removed to wheel weight lost in the same period) obtained at three different metal removal rates are given below:

TABLE 2

| METAL REMOVAL RATE ($MM^3$/MM · SEC) | COMPARATIVE G RATIO | INVENTION G RATIO | IMPROVEMENT % |
| --- | --- | --- | --- |
| 2.1 | 157.7 | 232.1 | 47 |
| 6.4 | 148.1 | 182.0 | 22 |
| 10.7 | 114.1 | 148.3 | 30 |

From the above it is readily apparent that even the above modest change in total impurities together with a significant reduction in calcia content confers significant benefits.

EXAMPLE 2

In this example the further advantage conferred by the use of purified alpha alumina seed is described. In the description that follows, the technique for producing the alpha alumina abrasive grits is essentially the same as the process described in Example 1 as representing the invention. Two runs were performed: the first being essentially identical to that of Example 1 (Invention) and a second which differed from the first only in that the seed material was ion-exchanged before use.

The seed material in each case was a charge of 2970 g of an aqueous alpha alumina seed slurry containing 4% by weight of the alumina which had a BET surface area greater than 120 $m^2$/g.

The ion-exchanged seed had a calcia content of 70 ppm whereas the seed before ion-exchanging had 330 ppm of calcia. The sodium oxide contents of the exchanged seed was less than 2 ppm and that of the non-ion exchanged seeds was 80 ppm.

The charge that had been purified had been treated with 1.33 parts per hundred parts of the slurry of DOWEX HCR-WL ion exchange resin in the form of 16–40 mesh spherical beads for 10–15 minutes.

The seed slurry was mixed with 60,000 g of deionized water and 14,850 g of "Disperal" boehmite from Condea which had a BET surface area of 180–190 $m^2$/gm. The mixture was evacuated to remove air bubbles and a solution of 1,061 g of 70% nitric acid in 1,000 g of deionized water was added with the mixture still under vacuum. Mixing under vacuum was continued for 10 minutes to produce a sol-gel. This was dried, roll-crushed to −24 T+120 T size range and fired in a preheated rotary furnace for 10 minutes to obtain an alpha alumina with a density of about 3.88 g/cc. The fired material was screened and an 80 grit fraction separated for evaluation.

Two vitreous bonded wheels were made: one using the grain made with ion-exchanged seed and one with the untreated seed. In all other respects the products were identical. Both were made to K grade and 8 structure using the same low temperature commercial bond used by Norton to produce abrasive wheels. The wheels were 12.7 cm in diameter and 1.27 cm in thickness. The wheels were dressed using a diamond roll.

The workpiece ground was made of 52100 steel and had a diameter of about 10.16 cm and a thickness of 0.64 cm. The workpiece was ground at three different infeed rates corresponding to low, medium and high pressure grinding situations. The grinding wheel was rotated at about 9,000 surface feet per minute, (2743 m/min), and the grinding was continued until from about 0.08 inch, (2 mm), to 0.12 inch, (3 mm), had been removed. The performance was rated in terms of the "Grindability Index" which is the metal removal rate divided by the product of the power consumed during grinding and the square of the wheel wear rate. The higher the value of the Index the better the grinding performance.

The Grindability Indices, (in $mm^3$/W.sec), measured for the two wheels were as follows:

TABLE 3

| WHEEL | LOW MRR | MEDIUM MRR | HIGH MRR |
| --- | --- | --- | --- |
| PURE SEEDS | 5.7 | 7.0 | 6.2 |
| NON-PURE SEEDS | 4.5 | 4.7 | 4.2 |

LOW MRR is 3.2 $mm^3$/mm · sec.
MEDIUM MRR is 6.4 $mm^3$/mm · sec.
HIGH MRR is 10.7 $mm^3$/mm · sec.

From the above data it will be appreciated that the purification of the seeds generates a further performance advantage in the final product

EXAMPLE 3

A seeded sol-gel alumina was prepared using deionized water and a boehmite with a BET surface area of about 210–230 $m^2$/gm. Alpha alumina seeds with a BET surface area of 120–130 $m^2$/gm in an amount of 1% of the boehmite weight were added. The sol-gel had 10–15% solids and was very fluid. The sol-gel was purified by being ion-exchanged and was then dried, crushed and fired in a rotary furnace to a density of 3,93 gm/cc. The sintered alpha alumina particles had a crystal size, measured by the intercept method, of 100 nm and upon analysis proved to have the following impurities:

|  |  |  |
| --- | --- | --- |
| CaO | 40 ppm |  |
| $Fe_2O_3$ | 60 ppm |  |
| $Na_2O$ | <1 ppm |  |
| $SiO_2$ | 620 ppm |  |
| $TiO_2$ | 1820 ppm |  |
| MgO | 150 ppm |  |
| Total Impurities 2690 ppm. | CaO/Total Impurities | 1.5% |

An 80 grit abrasive grain was separated and used to make a vitreous bonded grinding wheel. A commercial seeded sol-gel alumina with the same grit size was used to make an otherwise identical wheel and the two were used to grind 52100 steel in a wet OD grinding mode. The power consumed during grinding was measured for each wheel. The power used and the percentage power reduction shown by the grain of the invention over the comparative grain are shown in Table 4.

TABLE 4

| Infeed Rate $mm^3$/mm · sec | Invention Power in W/mm | Comparison Power in W/mm | Percentage Reduction |
| --- | --- | --- | --- |
| 3.2 | 116 | 168 | 31 |
| 4.8 | 157 | 241 | 35 |
| 5.9 | 185 | 268 | 31 |
| 8.1 | 221 | 335 | 35 |
| 11.2 | 289 | 404 | 28 |

From the above it is clear that the grain according to the invention cuts more freely with lower power consumption than the conventional commercial grain.

EXAMPLE 4

The following Example presents the improvement over the prior art in a slightly different context. It is well known that premium abrasive grains are often diluted with less costly grains in use since the performance decreases less rapidly than the premium grain content. Thus, for example 75% of the performance of the undiluted grain might be achieved with only 50% of the weight of the grain being the premium grain.

To make this evaluation, "Invention" and "Comparative" grains were made according to Example 1 with the difference that the grain sizes were 54 grit. These premium grains were mixed with fused alumina of the same grit size and the mixtures were used to make up vitreous bonded abrasive wheels, ("J" grade, 8 structure), that were identical other than in the matter of the premium grain used. The wheels were used in the wet surface grinding of D3 steel. The G-Ratio for each wheel was measured and the results appear in Table 5.

TABLE 5

| % SG | % FA | WITH INV. (I) G.RATIO | WITH COMP. (C) G.RATIO | I/C AS % |
| --- | --- | --- | --- | --- |
| 100 | 0 | 8.1 | 5.5 | 147 |
| 70 | 30 | 6.6 | 4.2 | 157 |
| 50 | 50 | 5.5 | 4.1 | 134 |
| 30 | 70 | 4.7 | 3.8 | 124 |

"SG" indicates the premium sol-gel grain.."I" indicates the grain according to the present invention and "C" indicates the conventional commercial seeded sol-gel alumina grain described in Example 1.
"FA" indicates the fused alumina blended with the premium grain.

From this Example it can be seen that a wheel made with a grain mixture obtained by blending only 50% of premium grain according to the invention with a fused alumina yields a product that has the same G-Ratio as a wheel in which the grain component is supplied by 100% of the conventional sol-gel alumina grain.

What is claimed is:

1. A seeded sol-gel alumina abrasive grain wherein the grain comprises minor amounts of metal oxide impurities selected from the oxides of alkali metals, alkaline earth metals, transition metals, rare earth metals and silica wherein the amount of calcia present is less than 100 ppm and the total amount of impurities is less than 3000 ppm, all impurities being measured as the oxides of the respective elements.

2. A seeded sol-gel alumina abrasive grain according to claim 1 in which the percentage by weight of calcia based on the total impurities is less than 5%.

3. A seeded sol-gel alumina abrasive grain according to claim 1 in which the amount of calcia present is less than 60 ppm.

4. A seeded sol-gel alumina abrasive grain according to claim 1 in which the amount of calcia represents less than 2% of the total amount of the impurities.

5. A seeded sol-gel alumina abrasive grain according to claim 1 wherein the amount of calcia present is less than 50 ppm, the total amount of impurities is less than 2,000 ppm and the percentage by weight of calcia based on the total impurities is less than 2.5%.

6. A seeded sol-gel alumina abrasive grain according to claim 1 in which the crystal size of the alumina is less than 200 nm.

7. A seeded sol-gel alumina having a calcia impurity level less than 100 ppm and total impurities content of less than 3000 ppm and an average crystal size of less than 120 nm.

8. A seeded sol-gel alumina abrasive grain according to claim 7 in which the density is greater than 3.90 gm/cc.

9. A process for the production of a sol-gel alumina abrasive material which comprises forming a dispersion of an alpha alumina precursor in water, adding thereto submicron alpha alumina material in an amount of up to about 10% by weight to provide nucleation centers for the conversion of the precursor to the alpha phase, and thereafter removing the water and firing to a temperature sufficient to cause the formation of alpha alumina and to sinter the alumina to essentially theoretical density, wherein the materials used are purified such that the fired alumina consists of alpha alumina with impurities in which the total amount by weight of calcium, measured as the oxide, is less than 100 ppm; and the total amount of impurities present is less than about 4000 ppm; all impurities being measured as the oxides.

10. A process according to claim 9 in which the calcia represents less than 5% of the total weight of all impurities present.

11. A process according to claim 9 in which the grain is produced in a sol-gel process in which all the water used is purified before use by a process selected from the group consisting of an ion-exchange, reverse osmosis and distillation.

12. A process according to claim 9 in which the alpha alumina seeds are purified before use by a process selected from the group consisting of ion exchange, washing and leaching.

13. A process according to claim 9 in which the alpha alumina precursor is a boehmite with a BET surface area of at least 150 $m^2$/gm.

14. A process according to claim 13 in which the boehmite has a BET surface area of from 200–400 $m^2$/gm.

* * * * *